United States Patent [19]

Mehta

[11] Patent Number: 5,222,220
[45] Date of Patent: Jun. 22, 1993

[54] MICROPROCESSOR STACK BUILT-IN GUARDS

[76] Inventor: Hemang S. Mehta, 2865 Woodford Dr., Sterling Heights, Mich. 48310

[21] Appl. No.: 437,239

[22] Filed: Nov. 16, 1989

[51] Int. Cl.⁵ .......................................... G06F 11/28
[52] U.S. Cl. ...................... 395/375; 371/12; 395/575; 364/DIG. 1; 364/247.7; 364/265; 364/265.6; 364/267.4
[58] Field of Search ............... 371/12, 13, 19; 364/200 MS File, 900 MS File; 395/375, 575

[56] References Cited

U.S. PATENT DOCUMENTS

| | | | |
|---|---|---|---|
| 4,398,244 | 8/1983 | Chu et al. | 364/200 |
| 4,410,938 | 10/1983 | Higashiyama | 371/19 |
| 4,571,677 | 2/1986 | Hirayama et al. | 371/19 |
| 4,656,604 | 4/1987 | Van Loon | 364/900 |
| 4,812,967 | 3/1989 | Hirosawa et al. | 364/200 |
| 4,881,228 | 11/1989 | Shouda | 364/900 |
| 4,920,538 | 4/1990 | Chan et al. | 371/19 |
| 5,058,052 | 10/1991 | Sexton et al. | 395/375 |

FOREIGN PATENT DOCUMENTS 0146553 11/1979 Japan ................................ 371/16.5

*Primary Examiner*—Michael R. Fleming
*Assistant Examiner*—Debra A. Chun
*Attorney, Agent, or Firm*—Mark P. Calcaterra

[57] ABSTRACT

The present invention is a method for a microprocessor such that when a call is made to a subroutine or an interrupt, a return address is stored in a "stack" memory (RAM) and also that a particular piece of hardware write the return address to an additional register (latches) within the microprocessor. The method enables a comparison to be made at the end of the subroutine or interrupt such that the address to which the subroutine tries to return is compared to the address as latched into the hardware portion of the microprocessor to detect whether any human error has occurred in the programming of the interrupt program or the subroutine.

3 Claims, 3 Drawing Sheets

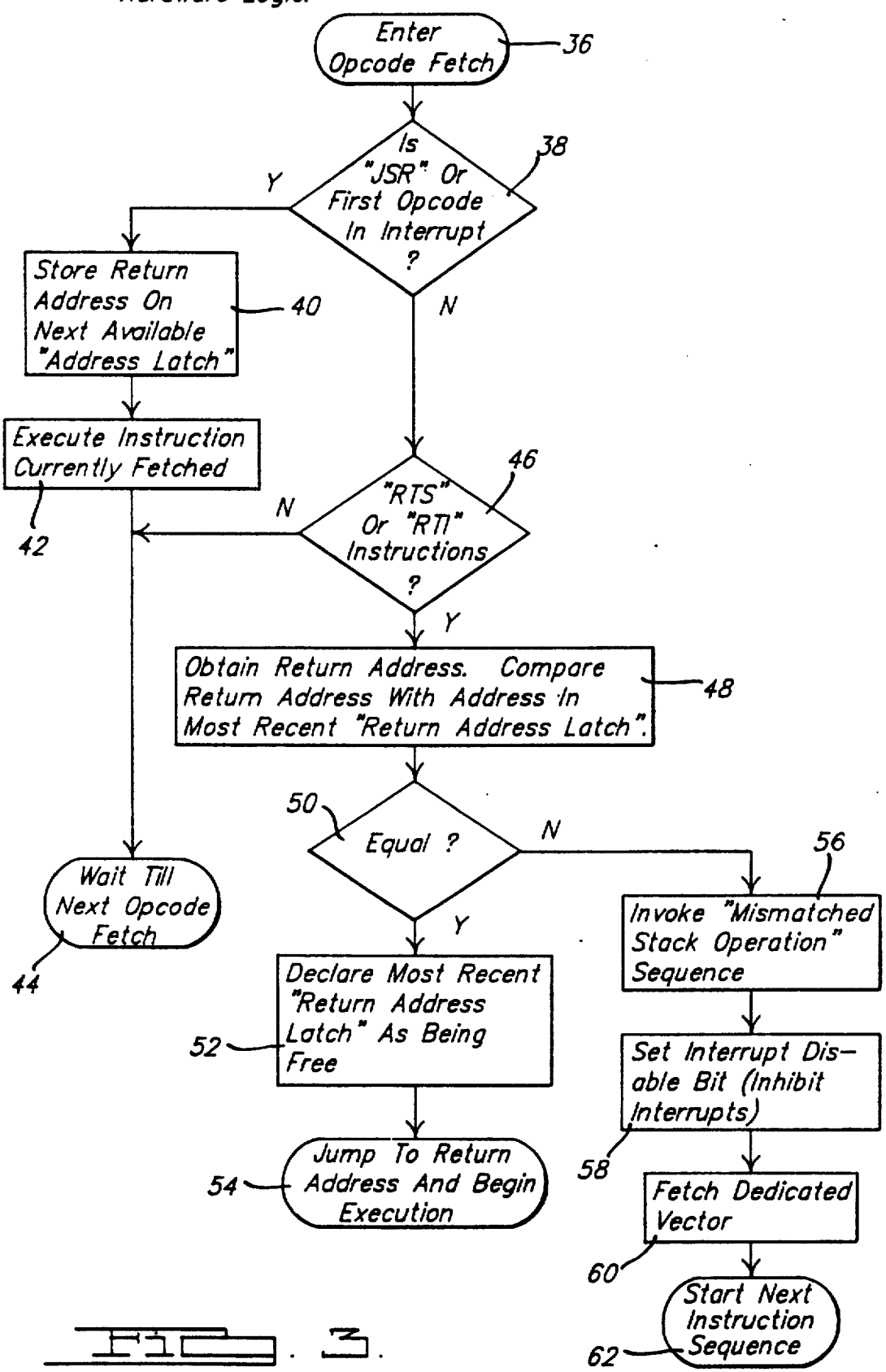

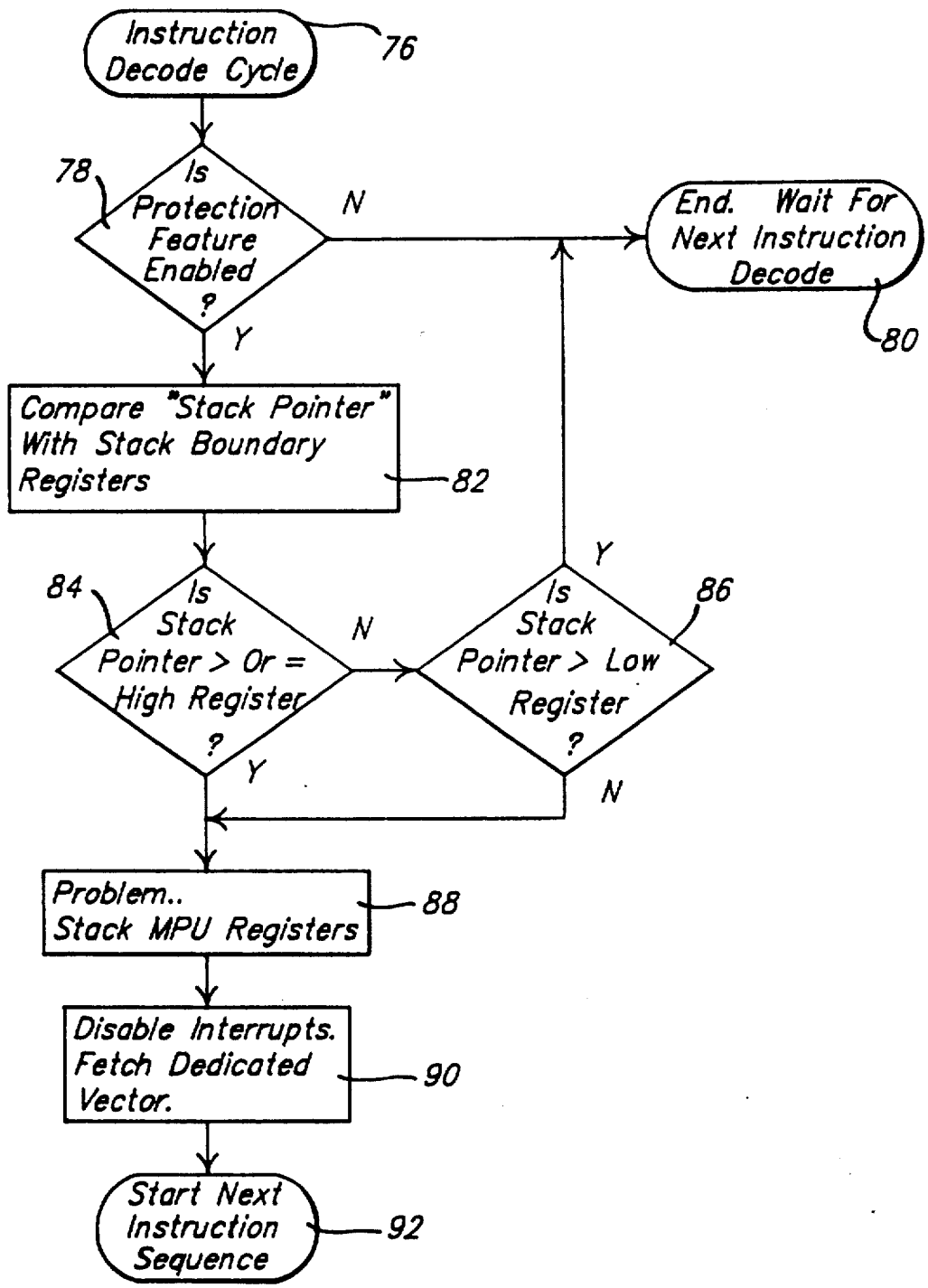

MICROPROCESSOR STACK BUILT-IN GUARDS

BACKGROUND OF THE INVENTION

1. Field Of The Invention

The present invention relates generally to a microcomputer system, and more particularly to, a method of handling stack related errors of a microprocessor in a microcomputer system.

2. Description Of Related Art

Commonly, a microcomputer system includes a microprocessor unit (MPU) having at least one internal register such as a stack pointer. The stack pointer is typically a 16-bit (two-byte) register that contains a beginning address, normally in random access memory (RAM), where the status of the MPU registers may be stored when the MPU has other functions to perform, such as during an interrupt or during a branch to subroutine. The address in the stack pointer is the starting address of sequential memory locations in RAM, where MPU contents of the registers will be stored. Typically, the MPU will execute instructions at a new location that contains the subroutine. When this subroutine is over, a return from subroutine (RTS) instruction is encountered. This tells the MPU that there are no more instructions in the subroutine and that it should return to the main program at its original address.

In general, problems sometimes occur in the use of a return address by a subroutine as retained in the stack pointer or RAM of the microcomputer. More specifically, when a subroutine is utilized, a return address from the main program is written into a memory address in the stack pointer so that the subroutine will know which section of the main program to return to after finishing its job. At the end of the subroutine, the subroutine will employ a return from subroutine instruction and read the return address that was stored at the beginning of the subroutine. At this point, the microprocessor would load the return address from the stack pointer and return to the main program at that memory address location or at that point in the main program.

A problem which is common in this type of programming is that the subroutines can be written by many individuals and could contain an error. One of the most common errors that appears in such subroutines is the use of an indirect indexed address and other stack manipulation instructions which involve pointing toward a memory address location and confusing the contents of a memory address location with the memory address itself. It can readily be seen that if the memory address is confused with the actual contents of the memory location that significant error could occur and that the program could be sent to an address that was either a wrong address or a piece of data. This is what is commonly referred to as a "bug". This type of situation also is readily apparent in the use of programs on an interrupt basis as combined with a stack pointer or traditional stack pointer type of program or which operate on an interrupt only basis.

SUMMARY OF THE INVENTION

The present invention proposes a hardware modification through the microprocessor to deal with the above type of problems. It is proposed that when a call is made to a subroutine or an interrupt that not only is a return address stored in a stack pointer (RAM) but also that a particular piece of hardware write the return address to an additional register (latches) within the microprocessor. This will enable a comparison to be made at the end of the subroutine or interrupt between the address to which the subroutine tries to return and the address as latched into the hardware portion of the microprocessor. In other words, an internal comparison will be made to detect whether any human error has occurred in the programming of the interrupt program or the subroutine. If an error is detected, a flag or a reset sequence or both could be implemented, including the storing of a fault code to let the operator know that a program error has occurred. The purpose for this is to alert the programmers that a stack pointer type of problem has occurred which may be affecting more than just the storing of the return address and therefore, it should be corrected.

Although the present invention proposes a hardware modification to microprocessors to deal with the above type of problems, it was anticipated that the electronics industries could also accomplish this type of modification without using hardware modification, but by merely using a particular program stored within the microprocessor that is safe from user or programmer alterations which could perform the above described function. It should be appreciated that the above described methodology can be used in situations involving subroutines or interrupts to locate and to deal with what we will define as a stack mismatch; as well as a runaway condition of the stack pointer in a main program to account for the situation where the stack pointer information is "contaminated". In other words, the stack pointer is contaminated with erroneous addresses or data it is compared to limits, fences or designated boundaries such that if these boundaries are exceeded or crossed, an error code or flag will be generated.

Other advantages of the present invention will be readily appreciated as the same becomes better understood after reading the following detailed description when considered in connection with the accompanying drawings.

BRIEF DESCRIPTION OF THE DRAWINGS

FIG. 3 is a flowchart of the hardware methodology for stack mismatch used in connection with the microcomputer system of FIG. 1.

FIG. 5 is a flow chart of the hardware methodology for stack runaway detection for use in connection with the microcomputer system of FIG. 1.

DESCRIPTION OF THE PREFERRED EMBODIMENT

Figure 1:
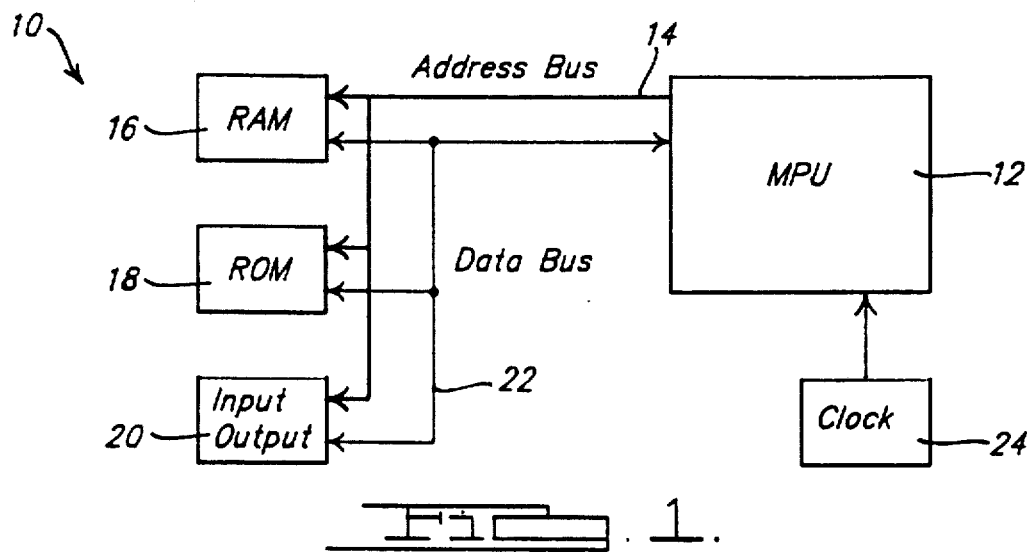
FIG. 1 is a schematic view of a microcomputer system used in accordance with the present invention.

Referring to FIG. 1, a microcomputer system 10 is shown for use in connection with the method of the present invention. The microcomputer system 10 includes a microprocessor unit (MPU) 12. The microprocessor system 10 also includes an address bus 14 for interfacing with a random access memory (RAM) 16, read only memory (ROM) 18 and input/output device 20. The RAM 16 also has a reserved area of memory or a stack pointer (not shown). The microcomputer system 10 also includes a data bus 22 for interfacing with the MPU 12, RAM 16, ROM 18, and input/output device 20. The microcomputer system 10 further includes a clock 24 for providing an input to the MPU 12. It should be appreciated that the microcomputer system 10 is conventional and known in the art. It should also be appreciated that any suitable components may be used to construct the microcomputer system 10.

Figure 2:
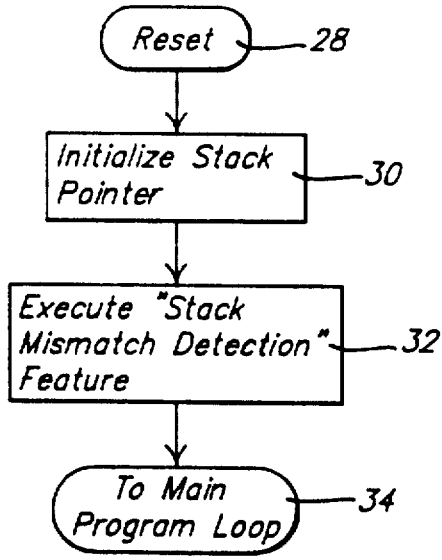
FIG. 2 is a flowchart of a software methodology for stack mismatch used in connection with the microcomputer system of FIG. 1.

Referring to FIG. 2, a flowchart for the software methodology of stack mismatch according to the present invention is shown. This methodology can detect "subroutine" or "interrupt" logic which manipulate stack pointers for the MPU 12. The subroutine or interrupt logic can cause the MPU 12 to return with a wrong return address when a mistake occurs. When this happens, the MPU 12 can jump into erroneous areas, causing typically fatal errors. The stack mismatch methodology according to the present invention solves this problem by writing the return address to an additional register as will be described.

The software methodology for the stack mismatch enters from a main program loop and starts in bubble 28 with a reset of the MPU 12. The methodology then advances to block 30 and initializes a stack pointer of the MPU 12. The methodology then advances to block 32 and executes the stack mismatch detection feature to be described as shown in FIG. 3. The methodology then advances to bubble 34 and exits or returns to the main program loop. It should be appreciated that the software methodology would allow the operator or programmer to control the execution of the stack mismatch feature.

Referring to FIG. 3, a hardware methodology of the stack mismatch detection feature or operation in block 32 is shown. The hardware methodology would be stored in the hardware of the microcomputer system 10 and executed automatically. The methodology starts in bubble 36 with an Opcode fetched and advances to diamond 38 for determining whether a "first Opcode" or jump to subroutine "JSR" is an interrupt. If so, the methodology advances to block 40 and stores the return address on the next available "address latch". It should be appreciated that the address latch is mirror image RAM to the stack pointer. The methodology then advances to block 42 and executes the instruction of the Opcode currently fetched. The methodology then advances to bubble 44 and waits until the next Opcode is fetched. It should be appreciated that when the program goes to an interrupt vector or to a subroutine due to a call by a "JSR" instruction, the return address of a program counter can be stored with the next available of a plurality of latches.

If the first Opcode or JSR is not an interrupt in diamond 38, the methodology advances to diamond 46 and determines whether a return from subroutine "RTS" or return from interrupt "RTI" instruction has been received. If not, the methodology advances to bubble 44 previously described. If so, the methodology advances to block 48 and obtains the return address from the stack pointer. The return address is then compared with the address in the most recent "return address latch". The methodology then advances to diamond 50 and determines whether the comparison of the addresses is equal. If the addresses are equal, the methodology advances to block 52 and declares the most recent return address latch as being free. The methodology then advances to bubble 54 and jumps to the return address and begins execution. It should be appreciated that upon returning from a subroutine or interrupt, the MPU 12 would compare the values of the actual return address of the counter with the latched-in value.

In diamond 50, if the addresses are not equal, the methodology advances to block 56 and invokes a "mismatched stack operation sequence" by advancing to block 58 and setting an interrupt disable bit, thereby inhibiting interrupts. The methodology then advances to block 60 and fetches a dedicated vector. The methodology then advances to bubble 62 and starts the next instruction sequence. It should be appreciated that when the return addresses are unequal, the program is arrested to a dedicated vector where a diagnostic fault code can be stored and the program can be initialized via a reset vector.

Figure 4:
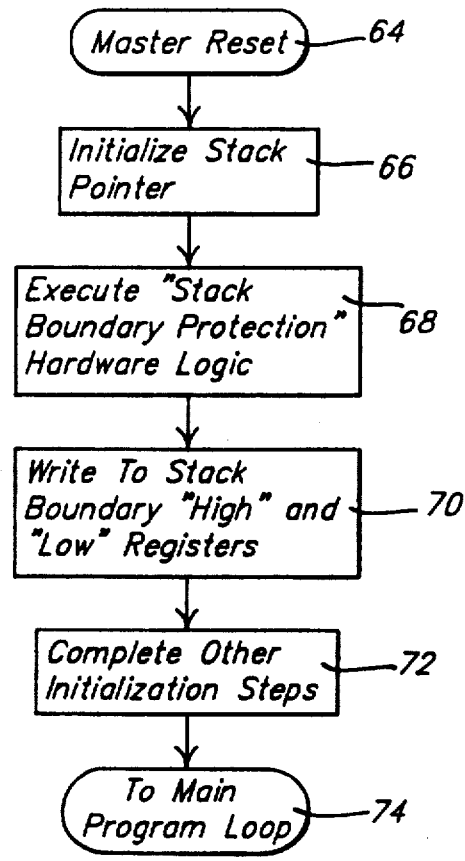
FIG. 4 is a flowchart of a software methodology for stack runaway detection for use in connection with the microcomputer system of FIG. 1.

Referring to FIG. 4, a software methodology for a stack runaway detection according to the present invention is shown. Stack runaway occurs when the stack pointer goes outside designated boundaries in memory. The methodology starts in bubbles 64 and resets the MPU 12. The methodology advances to block 66 to initialize the stack pointer. The methodology then advances to block 68 and executes the stack boundary protection or runaway detection hardware methodology or logic of FIG. 5 to be described. The methodology then advances to block 70 and writes to the stack boundary "high" and "low" registers. The methodology then advances to block 72 and completes other initialization steps. The methodology then advances to bubble 74 and exits or returns to the main program loop.

Referring to FIG. 5, a hardware methodology of the stack runaway detection in block 68 is shown. The hardware methodology starts in bubble 76 with an instruction decode cycle received from block 78. The methodology then advances to diamond 78 and determines whether the protection feature is enabled, such as by looking for a flag. If the protection feature is not enabled, the methodology advances to bubble 80, ending and waiting for the next instruction decode from block 78. If the protection feature is enabled, the methodology advances to block 82 and compares the stack pointer with the high and low stack boundary registers. It should be appreciated that the high and low "stack boundary" registers are located in RAM 16.

The methodology then advances to diamond 84 and determines whether the stack pointer is greater than or equal to the high stack boundary register. If the stack pointer is not greater than or equal to the high stack boundary register, the methodology advances to diamond 86 and determines whether the stack pointer is greater than the low stack boundary register. If the stack pointer is greater than the low stack boundary register, the methodology advances to bubble 80 previously described.

If the stack pointer is greater than or equal to the high stack boundary register in diamond 84 or the stack pointer is less than or equal to the low stack boundary register in diamond 86, the methodology advances to block 88 and stacks the registers of the MPU 12. The hardware methodology then advances to block 90 and disables any interrupts and fetches the dedicated vector. The methodology then advances to bubble 92 and starts the next instruction sequence. It should be appreciated that from block 84 onwards, if the "stack pointer" value equals or goes outside the "stack boundary" values, a built-in "trap" arrests the program counter to a dedicated vector. (Similar to the "illegal opcode trap".) Thus if a program error continuously "pushes" stack excessively, the hardware methodology would take the program to the designated trap vector where a fault code can be stored and the program can be initialized via an initialization sequence. It should also be appreciated that after initializing the stack pointer, the program can define the maximum allowable stack length by writing a suitable address into the "stack boundary" register.

The present invention has been described in an illustrative manner. It is to be understood that the terminology which has been used is intended to be in the nature of words of description rather than of limitation.

Obviously, many modifications or variations of the present invention are possible in light of the above teachings. Therefore, within the scope of the appended claims, the present invention may be practiced otherwise than as specifically described.

What is claimed is:

1. A method of detecting a stack mismatch condition in a program for a microcomputer system having a processing unit and memory means for containing a program counter and a stack pointer, comprising the steps of:

providing a plurality of latch register locations in said memory means for storing addresses corresponding to said stack pointer;

determining whether an Opcode instruction fetched by said processing unit is an interrupt or a call to a subroutine;

determining whether said fetched Opcode instruction is a return from interrupt or a return from subroutine instruction, if said fetched Opcode instruction is determined not to be an interrupt or a call to a subroutine;

storing a return address of said program counter in a next available latch register location when said fetched Opcode instruction is determined to be an interrupt or a call to a subroutine, and executing said fetched Opcode instruction;

comparing a return address obtained from said stack pointer with the most recent return address stored in said latch register when said fetched Opcode instruction is determined to be a return from interrupt or a return from subroutine instruction;

continuing the execution of said computer program at said return address if said return address from said stack pointer is equal to said most recent return address stored in said latch register; and invoking a programmed stack mismatch operation sequence if said return address obtained from said stack pointer is not equal to said most recent return address stored in said latch register.

2. The method according to claim 1, wherein said stack mismatch operation sequence includes arresting said program counter to a dedicated vector which will cause a diagnostic fault code to be stored.

3. A method of selectively guarding a microcomputer system from a stack runaway condition during the execution of a computer program for said microcomputer system, comprising the steps of:

initializing a stack pointer upon the resetting of said microcomputer system;

selectively enabling a stack boundary routine;

writing high and low stack addresses to stack boundary registers in said microcomputer system; and executing said stack boundary routine when said stack boundary routine is enabled;

said stack boundary routine including the steps of comparing the stack pointer with said high and low addresses stored in said stack boundary registers prior to the execution of each decoded instruction in said computer program, permitting the execution of said decoded instruction if said stack pointer is within said high and low addresses stored in said stack boundary registers, and executing a protection sequence if said stack pointer is outside of said high and low addresses stored in said stack boundary registers, said protection sequence including the steps of stacking predetermined registers in said microcomputer system, disabling the execution of any interrupts, and causing said microcomputer system to fetch and execute a dedicated protection vector before the next instruction sequence.

* * * * *

UNITED STATES PATENT AND TRADEMARK OFFICE
CERTIFICATE OF CORRECTION

PATENT NO. : 5,222,220
DATED : June 22, 1993
INVENTOR(S) : H. Mehta

It is certified that error appears in the above-indentified patent and that said Letters Patent is hereby corrected as shown below:

On the Title page, item [73], Assignee: insert --Chrysler Corporation--.

Signed and Sealed this

Twenty-eighth Day of June, 1994

Attest:

BRUCE LEHMAN

*Attesting Officer*   *Commissioner of Patents and Trademarks*